(12) United States Patent
Novotny

(10) Patent No.: US 6,688,650 B2
(45) Date of Patent: Feb. 10, 2004

(54) DRY DISCONNECT FLUIDIC COUPLING

(75) Inventor: Shlomo Novotny, Wayland, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 75 days.

(21) Appl. No.: 10/005,292

(22) Filed: Dec. 4, 2001

(65) Prior Publication Data

US 2003/0102664 A1 Jun. 5, 2003

(51) Int. Cl.$^7$ ................................................ F16L 55/00
(52) U.S. Cl. .......................... 285/13; 285/41; 285/93; 15/104.05; 219/644; 34/104
(58) Field of Search ............................ 285/13, 14, 41, 285/93, 316, 924; 15/104.05, 104.063; 219/644; 34/104, 105

(56) References Cited

U.S. PATENT DOCUMENTS

| | | | | |
|---|---|---|---|---|
| 1,994,169 A | * | 3/1935 | Comins | 285/11 |
| 2,637,572 A | * | 5/1953 | Bruce | 137/614.02 |
| 3,417,781 A | * | 12/1968 | Gregg | 137/614.04 |
| 4,133,095 A | * | 1/1979 | Lewis et al. | 29/458 |
| 4,462,223 A | * | 7/1984 | Perkins | 62/50.7 |
| 5,628,344 A | * | 5/1997 | Roberts | 137/614.06 |
| 6,009,901 A | * | 1/2000 | Roberts | 137/614.06 |
| 6,155,294 A | * | 12/2000 | Cornford et al. | 137/614 |

* cited by examiner

*Primary Examiner*—Eric K. Nicholson
(74) *Attorney, Agent, or Firm*—Bromberg & Sunstein LLP

(57) ABSTRACT

An apparatus and method for a dry disconnect coupling. The dry disconnect coupling includes a first coupling member for coupling to a second coupling member. A circuit provides a first signal based on when the first coupling member is disconnected to the second coupling member. Thermally coupled to the first coupling member is a first heater. The first heater generates heat based on the first signal.

23 Claims, 4 Drawing Sheets

DRY DISCONNECT FLUIDIC COUPLING

TECHNICAL FIELD

The present invention relates generally to an apparatus and method for a dry disconnect fluidic coupling, and in particular, a dry quick disconnect liquid coupling.

BACKGROUND OF THE INVENTION

Closed-loop liquid systems that are used in the electronic industry, and particularly the military, to cool electronics systems and circuit boards frequently utilize quick disconnect couplings. By using quick disconnect couplings, the coupling may be disengaged without having to shut off the pump and the cooling system. When disengaging the coupling, portions of the housing surfaces may remain wet because of the surface tension of the liquid. Additionally, a small amount of water may be expelled from the coupling. Consequently, a sponge is typically placed under the coupling area in order to absorb the excess liquid so as to avoid electrical shorts and corrosion in the system.

SUMMARY OF THE INVENTION

In accordance with one embodiment of the invention, a dry disconnect coupling includes a first coupling member for coupling to a second coupling member. A circuit provides a first signal based on when the first coupling member is disconnected to the second coupling member. Thermally coupled to the first coupling member is a first heater. The first heater generates heat based on the first signal.

In another embodiment of the invention, a method for drying a fluidic coupling having a first coupling member and a second coupling member is presented. The method includes providing a first signal based on whether the first coupling member is disconnected from the second coupling member. The first coupling member is heated based on the first signal.

In yet another embodiment of the invention, a coupling comprises a first coupling member for connecting to a second coupling member. The coupling includes means for providing a first signal based on when the first coupling member is disconnected from the second coupling member. The coupling also includes a means for heating the first coupling member based on the first signal.

In still yet another embodiment of the invention, a system for drying a fluidic coupling includes a surface. A first fluidic coupling member, for coupling to a second coupling member, is attached to the surface. A first heater is thermally coupled to the first fluidic coupling member. A first circuit provides a first signal to the first heater based on when the first coupling member is disconnected from the second coupling member. The first heater generates heat based on the first signal.

BRIEF DESCRIPTION OF THE FIGURES

The foregoing features of the invention will be more readily understood by reference to the following detailed description, taken with reference to the accompanying drawings, in which.

DETAILED DESCRIPTION

Figure 1:
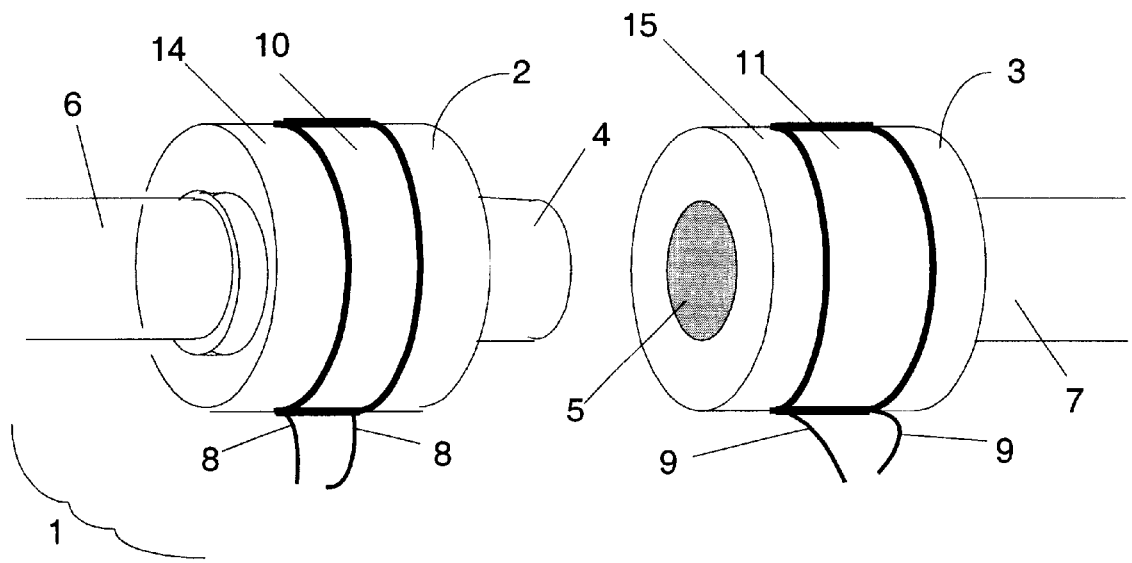
FIG. 1 is an isometric view of a dry disconnect coupling in accordance with one embodiment of the invention.

In accordance with one embodiment of the invention, FIG. 1 is a dry disconnect coupling 1 that includes two coupling members 2 and 3. Coupling members 2 and 3 attach to lines 6 and 7, respectively. Lines 6 and 7 may be, but are not limited to, piping or other conduits through which fluid flows. Lines 6 and 7 may be attached to coupling members 2 and 3 by various means know in the art, such as, but not limited to, solder, welding, and/or a threaded connection.

Coupling members 2 and 3 mate together to form a connection that allows fluid to flow between lines 6 and 7. Coupling 1 may be a quick disconnect fluidic coupling that permits the coupling members 2 and 3 to be readily removed or connected without having to shut off the flow of fluid. Each coupling member 2 and 3 typically includes a housing 14 and 15, respectively. Additionally, one coupling member 2 may include a male plug 4, which is inserted into a female socket 5 of the corresponding coupling member 3.

Thermally attached to the coupling member 2 is at least one heater 10. Similarly, at least one heater 11 may be thermally attached to corresponding coupling member 3. As shown in FIG. 1, heater 10 is a foil or flexible heater, however heater 10 is not limited to this configuration, and may instead be a cartridge heater or other heater known in the art. Heater 10 typically has a resistive element that is attached to either a single layer of material or laminated between two layers of material. Upon applying a current to the resistive element, heat is generated. Various materials known in the art can be used for the layer(s), such as, but not limited to, aluminum foil or silicone rubber.

Figure 2:
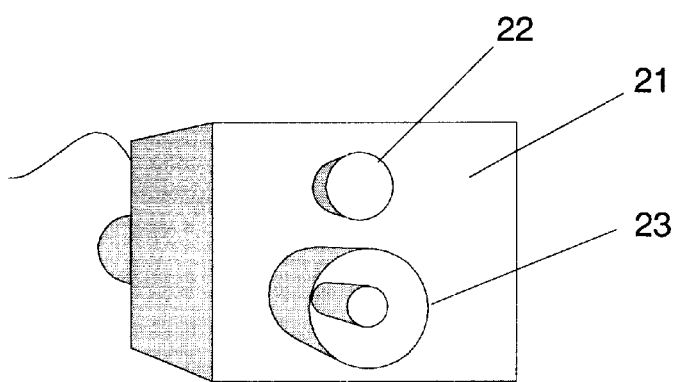
FIG. 2 is an isometric view of a cartridge heater and a coupling member embedded in a conductive material, in accordance with one embodiment of the invention.

Heater 10 may be attached to the housing 14 or other surfaces on coupling member 2 using, for example, adhesives, epoxies, or fasteners. Foil/flexible heaters are generally thin and bendable, such that they may be formed to that part of the coupling member 2 to which it is to be attached. Alternatively, heater 10 may be attached to a surface other than coupling member 2. For example, FIG. 2 shows a cartridge heater 22 that is embedded into a thermally conductive material 21, in accordance with one embodiment of the invention. A coupling member 23 is also embedded into the material 21, such that the heat generated by the heater is transferred to the coupling member 23. Conductive material 21 may be, for example, part of a metal mounting structure for a circuit board assembly that has a corresponding coupling member.

Figure 3:
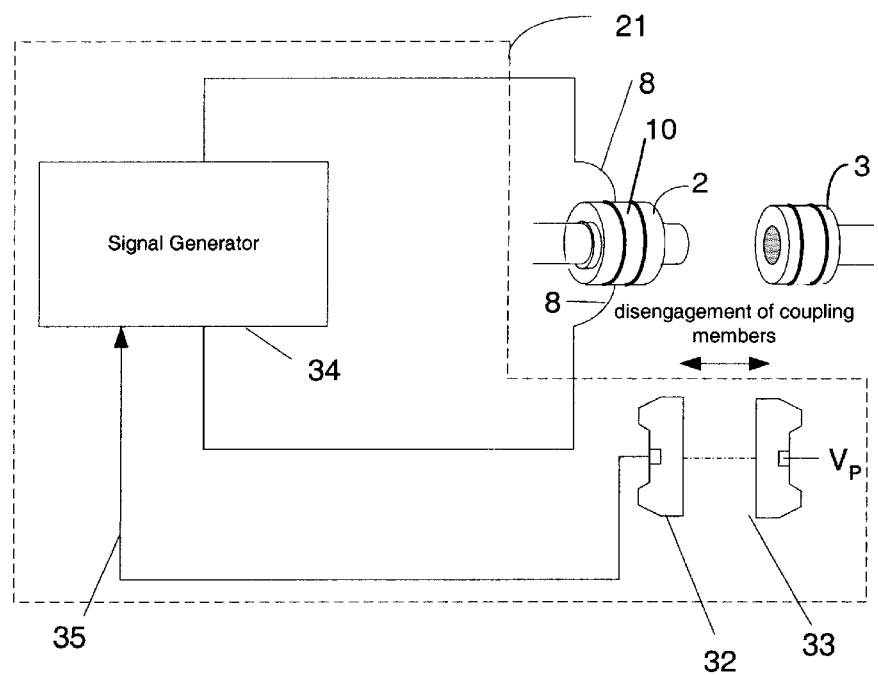
FIG. 3 is a schematic of a dry disconnect coupling in accordance with one embodiment of the invention.

Referring back to FIG. 1, at least one wire 8 attached to heater 10 (similarly at least one wire 9 may be attached to heater 11) is coupled to a circuit 21, as shown in FIG. 3. Upon disconnecting the coupling members 2 and 3, the circuit 21 provides a signal, which may be a power pulse, to heater 10, causing the heater 10 to generate heat temporarily. The heat pulse generated evaporates any fluid drops remaining on the decoupled member 2, reducing the risk of shorts and preventing any corrosion that could result.

Circuit 21 may include electrical connectors 32 and 33 or a switch for detecting disengagement of coupling members 2 and 3. Electrical connectors 32 and 33 or switch may be attached, or may be integral, to coupling members 2 and 3. Alternatively, the electrical connectors 32 and 33 or switch may be located elsewhere, such as on a circuit board and/or a mounting fixture associated with the coupling members 2 and 3. Switch may be a pushbutton switch, for example, which is pushed in and allows a voltage to pass when the coupling members are engaged. In another embodiment, which is not meant to be limiting, a monitor signal 35 may include a voltage signal $V_P$ that is routed through electrical connectors 32 and 33 when coupling members 2 and 3 are engaged. Upon disengagement of the coupling members 2 and 3, the electrical connectors 32 and 33 are also disengaged, causing interruption of voltage signal $V_P$. Indication of when the coupling members 32 are disengaged is thus provided by the falling edge of monitor signal 35.

Figure 4A:
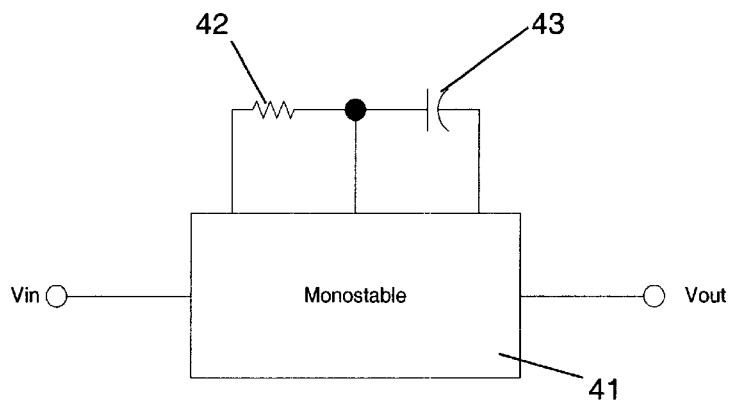
FIG. 4A is a schematic of a pulse generator that includes a monostable, in accordance with one embodiment of the invention.
Figure 4B:
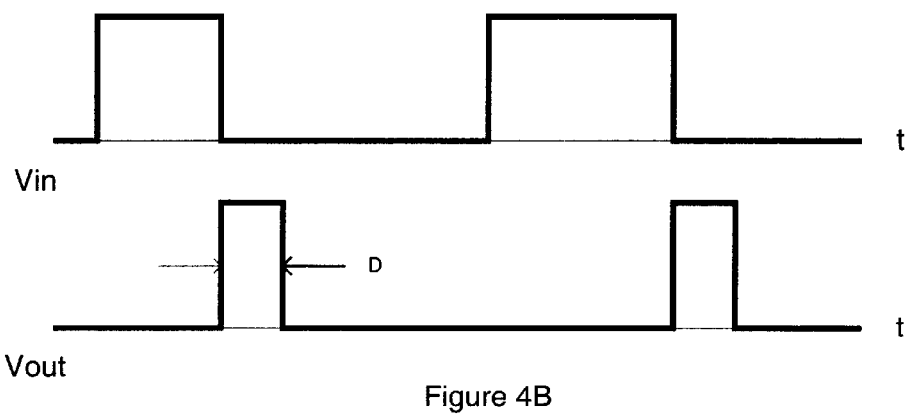
FIG. 4B shows sample pulses generated by the monostable shown in FIG. 4A in accordance with one embodiment of the invention.

As stated above, circuit 21 provides a signal upon disengagement of coupling members 2 and 3, which may be a power pulse, to heater 10 via lead wires 8. The signal causes heater 10 to generate heat, drying any fluid remaining on coupling member 2. To generate the power pulse, various circuits known in the art can be used, which may include various electronic components, such as, but not limited to, one or more monostables (also known as a one-shot), relays, capacitors, and/or resistors. For example, a pulse generator may include, as shown in FIG. 4A, a monostable 41 in combination with an external resistor 42 and capacitor 43. The monstable 41 triggers on the falling edge of the input signal, as shown in FIG. 4B and generates output pulses of duration $D=R*C \ln 2$ (approximately 0.7 RC). The pulse generated can be selected to be of sufficient duration to dry coupling member 2. The pulse may further serve to turn a relay on, which then provides a specific voltage to the heater. In alternative embodiments, a number of pulses may be generated to ensure sufficient drying of coupling member 2.

Figure 5:
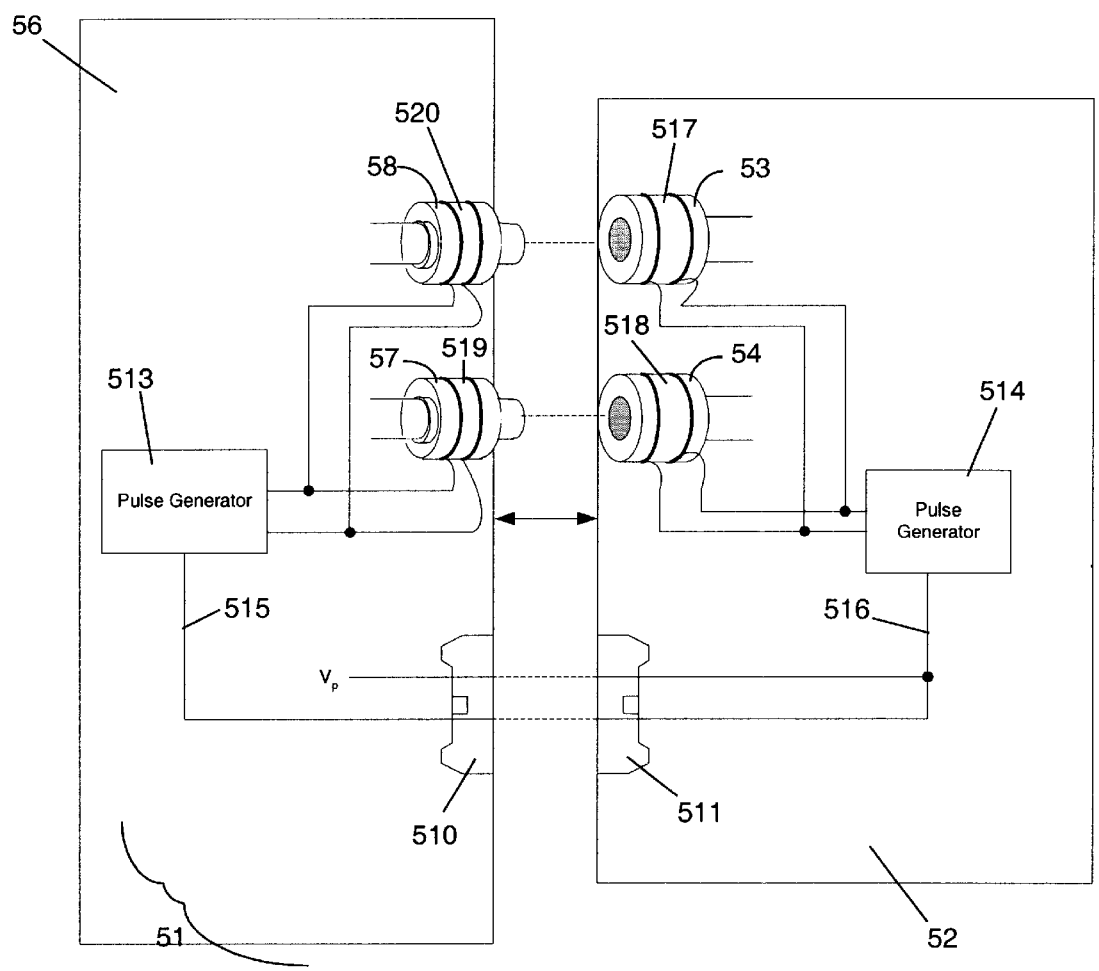
FIG. 5 is a system for drying fluidic couplings in accordance with one embodiment of the invention.

FIG. 5 is a system 51 for drying fluidic couplings in accordance with one embodiment of the invention. The system includes at least one surface 52, which may be a circuit board. Attached to the surface 52 are one or more couplings 53 and 54. Couplings 53 and 54 may, for example, serve as part of a supply and return line, respectively, for a fluidic circuit that cools electronic components mounted to surface 52.

The at least one surface 52 is inserted into a mounting fixture 56. Mounting fixture includes coupling members 57 and 58 that connect to corresponding coupling members 53 and 54 of surface 52, respectively. Mounting fixture 56 may be located inside an electronic housing (not shown), which provides structural support for components located therein. Electronic housings include, but are not limited to, desktop or tower computer enclosures/housings, and racks that may or may not be open-ended. Electronic housing, mounting fixture 56, and surface 52 may be of various sizes and shapes. Both surface 52 and mounting fixture 56 may include one or more electrical connectors 510 and 511 for transferring electrical signals between surface 52 and other electronic components in the system 51. Mounting fixture 56 and/or electronic housing may include a bus, such as a VME bus, for connecting various electronic components of the system 51.

Thermally coupled to at least one coupling member 53, 54, 57, 58 is a heater 517, 518, 519, 520, respectively. A circuit provides a signal, which may be a power pulse, to each heater 517, 518, 519, and 520 based on when the coupling members disengage. The circuit includes monitor signals 515 and 516 that are coupled to pulse generators 513 and 514 respectively. Monitor signals 515 and 516 are based on a voltage signal $V_P$ that is passed through electrical connectors 510 and 511. Alternatively, other implementations for monitoring coupling member disengagement include, for example, a switch that is coupled to at least one of the coupling members, as discussed above.

Upon disconnecting surface 52 from mounting fixture 56, electrical connectors 510 and 511 become disengaged, interrupting voltage signal $V_P$ and causing monitor signals 515 and 516 to go low. Based on monitor signal 515 going low, pulse generator 513 provides a signal, which typically is a power pulse, to heaters 519 and 520. Similarly, pulse generator 514, based on monitor signal 516 going low, provides a signal to heaters 517 and 518.

Mounting fixture 56 (or a housing which includes mounting fixture 56) typically is connected to a wall socket that provides, for example, 115 VAC. This may be utilized by pulse generator 513 or further converted to a different AC or DC voltage in providing a power pulse to heaters 519 and 520. On the other hand, pulse generator 514, which is attached to surface 52, is disconnected from mounting fixture 56 when generating a power pulse to heaters 517 and 518. Accordingly, pulse generator 514 may be coupled to, for example, and not meant to be limiting, a capacitor or battery that is coupled to surface 52.

Figure 6:
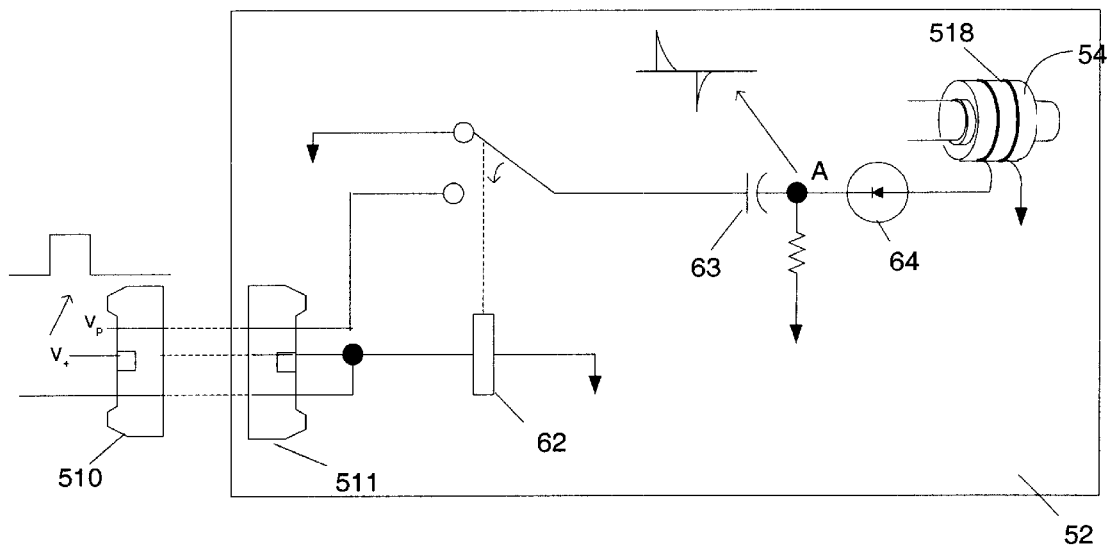
FIG. 6 is a schematic for generating a pulse that includes a capacitor, I accordance with one embodiment of the invention.

FIG. 6 is a circuit for generating a pulse that includes a capacitor 63, in accordance with one embodiment of the invention. Upon inserting surface 52 (see FIG. 5) into mounting fixture 56 (see FIG. 5), connectors 510 and 511 become engaged (along with couplings 518 and 519), connecting V+ to one side of relay 62. This in turn pulls in relay 62, connecting $V_P$ to capacitor 63 and charging capacitor 63, creating a positive voltage pulse at node A. A diode 64 prevents current from flowing across heater 518 during this positive voltage pulse. Upon removing surface 52 (see FIG. 1) from mounting fixture 56 (see FIG. 1), connectors 510 and 511 disengage. This opens relay 62, and connects capacitor 63 to ground. Capacitor 63 discharges, causing a negative voltage pulse and causing current to flow across heater 518. A heat pulse is thus generated by heater 518 based on when the coupling members 54 and 57 disengage, drying any fluid remaining on coupling member 57.

In alternative embodiments, $V_P$ may be coupled to surface 52 (see FIG. 5) and does not need to be routed through connectors 510 and 511. V+ may also be coupled to surface 52 (and routed through connectors 510 and 511) rather than mounting fixture 56.

Although various exemplary embodiments of the invention have been disclosed, it should be apparent to those skilled in the art that various changes and modifications can be made which will achieve some of the advantages of the invention without departing from the true scope of the invention.

What is claimed is:

1. A dry disconnect coupling comprising:
   a first coupling member for coupling to a second coupling member;
   a first circuit that provides a first signal based on when the first coupling member is disconnected from the second coupling member; and
   a first heater thermally coupled to the first coupling member, the first heater heating the first coupling member based on the first signal.

2. A dry disconnect coupling according to claim 1, wherein the first coupling member includes a first housing, the first heater thermally coupled to the first housing.

3. The dry disconnect coupling according to claim 1, wherein the first heater is a foil heater.

4. The dry disconnect coupling according to claim 1, wherein the first heater is a cartridge heater.

5. The dry disconnect coupling according to claim 1, wherein the coupling is a fluidic coupling.

6. The dry disconnect coupling according to claim 1, wherein the first signal includes a power pulse.

7. The dry disconnect coupling according to claim 1, further including:
the second coupling member; and
a second heater thermally coupled to the second coupling member.

8. The dry disconnect coupling according to claim 7, wherein the second heater heats the second coupling member based on the first signal.

9. The dry disconnect coupling according to claim 7, further including:
a second circuit, the second circuit for providing a second signal based on when the first coupling member is disconnected from the second coupling member, the second heater heating the second coupling member based on the second signal.

10. The dry disconnect coupling according to claim 9, wherein the second signal includes a power pulse.

11. A method for drying a fluidic coupling having a first coupling member and a second coupling member, the method comprising:
providing a first signal based on when the first coupling member is disconnected from the second coupling member; and
heating the first coupling member based on the first signal.

12. A method according to claim 11, further including heating the second coupling member based on the first signal.

13. A method according to claim 11, wherein providing a first signal includes providing a power pulse.

14. A method according to claim 11, further including:
providing a second signal to the second coupling member based on when the first coupling member is disconnected from the second coupling member; and
heating the second coupling member based on the second signal.

15. A coupling comprising:
a first coupling member for connecting to a second coupling member;
means for providing a first signal based on when the first coupling member is disconnected from the second coupling member; and
means for heating the first coupling member based on the first signal.

16. A coupling according to claim 15, wherein the coupling is a fluidic coupling.

17. A coupling according to claim 15, wherein the means for heating is a foil heater.

18. A coupling according to claim 15, wherein the means for heating is a cartridge heater.

19. A coupling according to claim 15, wherein the means for providing a first signal includes a switch.

20. A coupling according to claim 15, wherein the means for providing a first signal includes a battery.

21. A system for drying a fluidic coupling, the system comprising:
a surface;
a first fluidic coupling member attached to the surface, the first fluidic coupling member for coupling to a second coupling member;
a heater thermally coupled to the first fluidic coupling member; and
a circuit that provides a signal based on when the coupling member is disconnected from the second coupling member, the heater heating the first coupling member based on the signal.

22. A system according to claim 21, wherein the surface is a circuit board.

23. A system according to claim 21, wherein the circuit includes a battery.

* * * * *